United States Patent [19]
Mey

[11] 3,791,734
[45] Feb. 12, 1974

[54] MICROFILM CAMERA AND LIGHT SOURCE THEREFOR

[75] Inventor: Hansjurg Mey, Kehrsatz, Switzerland

[73] Assignee: Walter Leemann A.G. Fabrik fur fototechnische, elektronische und feinmechanische Apparate, Canton of Fribourg, Switzerland

[22] Filed: Dec. 11, 1972

[21] Appl. No.: 314,252

[30] Foreign Application Priority Data
Oct. 13, 1972   Switzerland................ 14974/72

[52] U.S. Cl.................. 355/67, 95/11.5, 352/209
[51] Int. Cl...................... G03b 27/54, G03b 27/76
[58] Field of Search..... 95/11.5, 60; 355/67, 69, 71; 352/208, 209, 214, 216

[56] References Cited
UNITED STATES PATENTS
3,397,612   8/1968   Ludloff.......................... 355/69 X
3,490,835   1/1970   Nemeth et al.................. 352/216
R26,326   12/1967   Van Der Feyst et al. ....... 352/208 X Primary Examiner—Joseph F. Peters, Jr.

[57] ABSTRACT

A microfilm type camera utilized with an illumination device for impressing an image on film having a light source powered by an alternating current power supply for illuminating the image to be exposed to the sensitive film, an adjustable electrically powered shutter device for selectively admitting light from the image to the film, and an electrical drive connected to the shutter device for operating the same in a way that the adjustable exposure time for each point of the light sensitive film zone to be exposed is equal to half the duration of a period of the alternating current power supply source powering the light source or is an integer multiple thereof in order to provide an even light exposure distribution over the total image to be exposed on the film.

9 Claims, 5 Drawing Figures

MICROFILM CAMERA AND LIGHT SOURCE THEREFOR

BACKGROUND OF THE INVENTION

1. Field of the Invention

The invention relates to a camera, in particular a micro-film camera with an illuminating fixture, provided with a light source to illuminate the subject to be photographed. It also is provided with an electrically powered shutter.

2. Description of the Prior Art

In micro-photography, the image has to be evenly illuminated by means of artificial light sources such as filament lamps, fluorescent lamps, cold cathode tubes or the like. If the camera is operated manually, such as for micro-photographs of addresses for postal or registration purposes, then the size, weight and heat emission of the light sources require special attention. Filament lamps are not satisfactory because of the extreme heat emission during continuous service, the inadequate lifetime of the lamps and because the unfavorable shape of these light sources would require very large geometrical dimensions to achieve even homogeneous illumination. Cold cathode tubes and fluorescent lamps show inherent disadvantages which are also present in filament lamps, however, here they are quantitatively so small that most often they can be neglected. If the light sources are powered by a common power supply, then the light intensity of the light source is modulated by its frequency. For example, if the A.C. frequency is 50 Hz, then the light intensity is modulated by a frequency of 100 Hz. This occurs with a high modulation amplitude in cold cathode tubes and fluorescent lamps, and with a small modulation amplitude in filament lamps because of the thermic inertia.

In a known type of camera having a shutter between the lens, the light quantity reaching the light sensitive zone not only depends on the time the shutter is open, but also depends on the timing of the opening and closing of the shutter, with respect to the above mentioned modulated light intensity of the power supply. The longer the opening time of the shutter, in comparison to one modulation cycle, and the smaller the modulation amplitude, the smaller the undesirable effect.

Exposure times for manually held cameras have to be kept small to get clear pictures, because of movement of camera or subject. This is true even when cameras are held substantially still. For reasons explained before, light sources with a large modulation amplitude are preferred. The resulting effect is so significant that it cannot be neglected, because of the resulting sults in exposure times which are apparently statistically changing from one picture to the next picture. Particularly in those cases where the camera is provided with a known focal plane shutter which is located closely to the image plane, this effect will show an uneven exposure distribution over the total image.

SUMMARY OF THE INVENTION

It is the object of the invention to design a camera without the before-mentioned disadvantages.

The camera, according to the invention, is provided with an electrically powered shutter device which gives for each point of the light sensitive zone to be exposed an adjustable exposure time equal to half or a multiple of the frequency of the A.C. power supply powering the light source.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENTS

Figure 1:
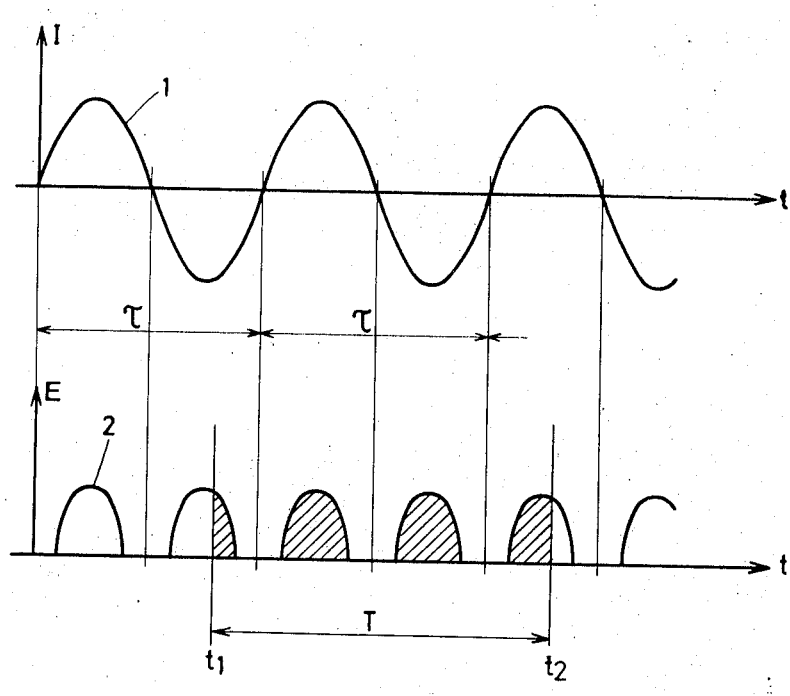
FIG. 1 is a graph illustrating the alternating current and the luminous intensity as a function of time.

Referring to the top graph of FIG. 1, there is illustrated some periods $\tau$ of an alternating current power supply utilized for powering a light source of a camera as will be later described hereafter. Referring to the bottom graph of FIG. 1, there is illustrated the luminous intensity E of a light source (e.g. a cold cathode tube or fluorescent lamp) shown as a function of time t. The maxima of the luminous intensity E coincide with the extreme values of the positive and negative half periods of the alternating current. In the area where the alternating current is 0, the luminous intensity $E = 0$. If the exposure of the film material begins at the time $t_1$ and ends at time $t_2$, the exposure time T is then $$T = t_2 - t_1.$$

The light quantity Q for the exposure of the film material is equal to the integral of the luminous intensity over the exposure time. Because of the periodic $E(t)$ the light quantity Q is independent of an arbitrary $t_1$, so $$T = n \times \tau/2$$

where $\tau$ is the A.C. period and $n$ is an arbitrary integer. If the exposure time T will be held constant, which can be achieved without difficulty, then the light quantity is independent of time $t_1$ at which the exposure starts.

The very high consistency of the A.C. frequency, provided by the public power supply, permits adjustment to a constant exposure time T or according to $n = 1, 2, 3 \ldots$. The relationship between exposure time T and the A.C. frequency periods $\tau$ can be made even simpler when exposure time T is derived from the frequency of the A.C. supply. This is possible, for example, when the exposure time of the shutter is determined by a synchronous motor which will be powered by the same power supply utilized to power the light source providing subject illumination.

Figure 2:
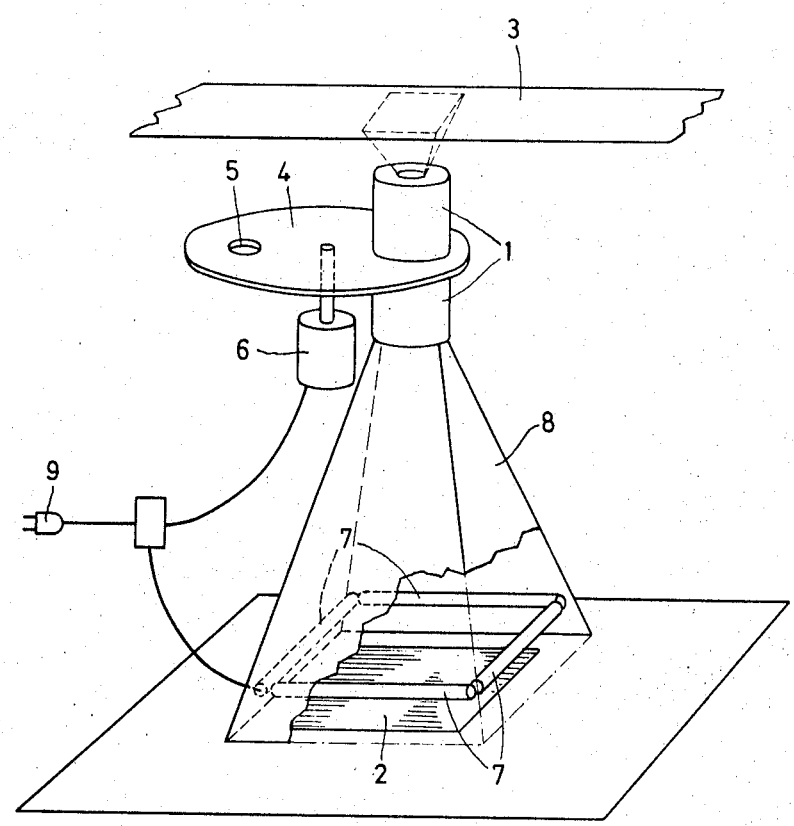
FIG. 2 is a schematic perspective view illustrating a first embodiment of a camera and shutter arrangement embodying the principles of the invention.

FIG. 2 shows a schematic representation of a simplified microfilm camera with a shutter between the lens. This camera consists of a two-part objective lens 1 to project an image 2 on a film 3, which film 3 may pass by the objective in an intermittent stepping type movement with the help of drive means (not shown). In an inoperative position, the light beams in objective 1 are blocked by a disc 4 extending between the two parts of the objective lens and having an axis parallel to the optical axis of the objective. In disc 4 an opening 5 is provided, which passes the light of objective 1 once for each revolution of disc 4. This is equivalent to one exposure of a picture. The time when the light can pass through the opening 5 and objective 1 is equal to the exposure time T.

A light source 7 to illuminate subject 2 includes four fluorescent lamps positioned near the subject and in the general area of the open end of a pyramid-shaped funnel 8 defined by the objective lens 1. These fluorescent lamps 7 are screened into the direction of the objective 1 by reflector shields (not shown) so that only light reflected by subject 2 can reach objective 1.

The disc 4 is rotated by a synchronous motor 6 attached thereto. This motor and the fluorescent lamps can be connected to the A.C. power supply by a plug 9. When the opening 5 in disc 4 is dimensioned properly, the relationship between exposure time T and A.C. power supply frequency period $\tau$ is independent from the present amplitude; in other words, the light quantity Q reaching the film 3 during exposure time T is independent of the particular time when the exposure starts.

Figure 3A:
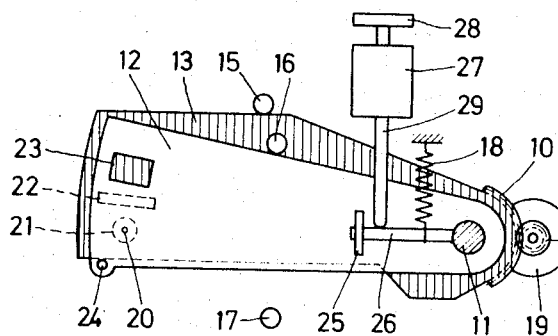
FIG. 3a is a top plan view illustrating a further embodiment of the invention with the shutter in its initial position.
Figure 3B:
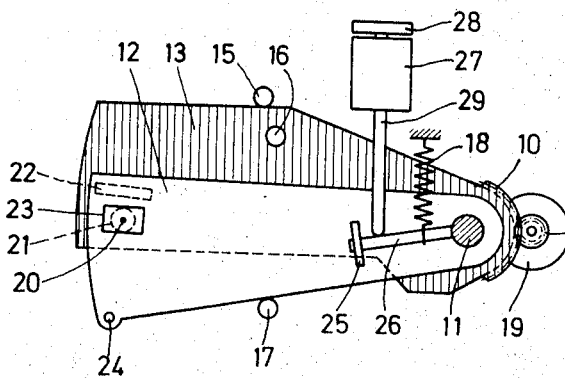
FIG. 3b is similar to FIG. 3a illustrating the shutter in a position just prior to exposure.
Figure 3C:
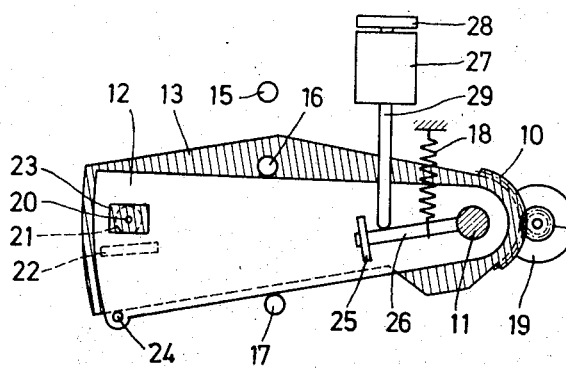
FIG. 3c is similar to FIG. 3a illustrating the shutter in an intermediate position after exposure.

FIG. 3 illustrates a further type of a shutter of a microfilm camera where the shutter is positioned adjacent to the film plane. The details of this type of shutter are explained in Swiss Pat. No. 402,597. This shutter utilizes a shutter plate 12 and a slotted plate 13 both of which can pivot about a common shaft 11. The pivoting movement is limited by two spaced stops 15 and 17. FIG. 3a shows the shutter in its initial position, FIG. 3b shows the shutter in a position just prior to exposure, and FIG. 3c shows the shutter in an intermediate position after exposure.

A concentric portion of shaft 11 of the slotted plate 13 is provided with teeth 10 interlocking with a pinion 14 connected to a synchronous motor 19.

The optical axis 20 of an objective (not shown) is perpendicular to the plane of the sheet of drawings. Reference numeral 21 designates the portion of the film where the image will be projected. The shutter plate 12 is provided with a rectangular opening 23 and the slotted plate 13 is provided with a rectangular slot 22. Inserted into the slotted plate 13 is a protruding stop 16 to engage shutter plate 12 to limit the pivoting movement between shutter plate 12 and slotted plate 13. A driving pin 24 is fastened to and protrudes downwardly from shutter plate 12 to engage slotted plate 13 and return the slotted plate to its initial position.

The shutter plate 12 is rigidly connected to shaft 11, while slotted plate 13 can pivot about shaft 11. A lever 26 has one end connected to shaft 11 with the other end carrying a pawl 25. Attached to lever 26 is a tension spring 18 which, referring to the drawings, exerts a clockwise directed torque on the shaft 11 and lever 26. As shown in the initial position of the shutter, FIG. 3a, the shutter plate 12 initially rests at stop 16 because of the pulling force of tension spring 18 which, in turn, lets slotted plate 13 rest at stop 15.

To move the shutter into the position illustrated in FIG. 3b, the coil of an electro magnet 27 is energized thereby attracting plate 28, so that a plunger 29 which is fastened to the plate 28 can engage and act on lever 26 to pivot the lever counterclockwise against the pulling force of tension spring 18. This pivoting motion is transmitted to shutter plate 12 by shaft 11. The pivoting movement of shutter plate 12 is limited by stop 17. The center of opening 23 is shutter plate 12 is now exactly aligned with the optical axis 20 of the objective mentioned before. However, the light is still blocked from the film by slotted plate 13 which has not moved yet.

Simultaneously, when shutter plate 12 hits stop 17, an electrical contact (not shown) is closed which starts synchronous motor 19. As a consequence, slotted plate 13 will rotate counterclockwise with an exactly defined angular speed until the pivoting motion is stopped by stop 24. At this point, preferably, the power supply to synchronous motor 19 will be interrupted, by means not shown here.

During the pivoting movement of slotted plate 13, the slot 22 has passed opening 23 in the shutter plate 12 and has allowed light rays to pass therethrough for a predetermined time. The opening dimensions of slot 22 are such that the exposure time T of each point of the film satisfies the above established condition $T = n \times \tau/2$. For example $\tau = 20$ msec for a power frequency of 50Hz. It follows that $T = 10, 20, 30$ or 40 msec. for a frequency of 60 Hz, $\tau = 16.66$ msec., and this means $T = 8.33, 16.66, 25.00$ or 33.33 msec. The exposure time T is equal to the time where one particular point on the film is exposed to the light rays or, in other words, is equal to the time it takes the slot 22 to move over said particular point. The exposure time required for an exposure limited by opening 23 therefore, is proportional to the ratio of the dimension of the opening 23 to the width of slot 22 measured in the moving direction.

The interim position of the shutter just after film exposure is shown in FIG. 3c. The electro magnet 27 still is energized and slotted plate 13 has followed the previous movement of shutter plate 12 so that slotted plate 13 rests at stop 24. The opening 23 in shutter plate 12 is covered again by slotted plate 13. Now the power to electro magnet 27 is disconnected and the shutter plate 12 is pivoted clockwise by spring 18. Stop 24 provides that slotted plate 13 will pivot backwards to the initial position at the same time as slotted plate 13. During this pivoting movement, no light can pass through plates 12 and 13 to the film. The pawl 25 on lever 26 engages a gear (not shown) which will be rotated by one step during the return movement of lever 26, causing the film to advance. Now the shutter is ready to start the next exposure.

As it can be seen in the above description, the exposure time T can only be changed in certain time intervals and this interval is not adjustable. The exposure time should be chosen as a multiple of the time for half a period of the A.C. power supply frequency utilized for powering the light source.

The exposure time T is dependent on two variables, namely the width of slot 22 in slotted plate 13 or the opening 5 in disc 4 respectively, measured in the moving direction, and on the mean velocity $v_m$ of the slot 22 or opening 5 respectively as it is moved transversely through the light rays.

Since the exposure time T cannot be chosen arbitrarily, as mentioned previously, the width of slot 22 or opening 5 and the velocity $v_m$ have to match. The condition to be satisfied is that the width of the slot $= v_m$ × T. Only in this way is it assured that each point of the film area to be exposed will get the right light exposure.

What I claim is:

1. The combination of a microfilm camera utilized with an illumination device for impressing an image on light sensitive film within a particular zone comprising:

an alternating current power supply source;
a light source powered by the alternating current power supply source and illuminating the image to be exposed to the light sensitive film;
an adjustable electrically powered shutter device for selectively admitting light from the image to the film; and
an electrical drive means operatively connected to the shutter device adapted for driving said shutter device in a way providing that the adjustable exposure time for each point of the light sensitive film zone to be exposed is equal to half the duration of a frequency period of the alternating current power supply source powering the light source.

2. The combination as claimed in claim 1 wherein the adjustable exposure time for each point of the light sensitive film zone to be exposed is equal to an integer multiple of half the duration of a frequency period of the alternating current power supply source powering the light source.

3. The combination as claimed in claim 2 wherein the light source includes at least one cathode tube lamp.

4. The combination as claimed in claim 2 wherein the light source includes at least one fluorescent lamp.

5. The combination as claimed in claim 1 wherein the shutter device comprises:

a framing member having an opening therein defining the light sensitive zone on the film;
a member adjacent the framing member and movable relative thereto, the movable member having an aperture therethrough positioned thereon for selective alignment with the frame member opening;

drive means adapted for activating the movable member at a selected mean velocity, measured at the framing member opening during the film exposure, in a manner providing that the relationship between the components is that the width of the movable member aperture, measured in the direction in which it passes by the frame member opening, is a multiple of the mean velocity multiplied by the selected exposure time for the film whereby each point of the film area to be exposed will receive uniform light exposure.

6. The combination as claimed in claim 2 wherein the shutter device comprises:

a framing member having an opening therein defining the light sensitive zone on the film;
a member adjacent the framing member and movable relative thereto, the movable member having an aperture therethrough positioned thereon for selective alignment with the frame member opening;

drive means adapted for activating the movable member at a selected mean velocity, measured at the framing member opening during the film exposure, in a manner providing that the relationship between the components is that width of the movable member aperture, measured in the direction in which it passes by the frame member opening, is a multiple of the mean velocity multiplied by the selected exposure time for the film whereby each point of the film area to be exposed will receive uniform light exposure.

7. The combination as claimed in claim 1 wherein the electrical drive means comprises a synchronous motor connected to the alternating current supply source, and the light source is connected to the same alternating current supply source as the motor whereby the quantity of light reaching the film from the light source during exposure of the film is independent of the time when the exposure begins and the frequency of the alternating current supply source.

8. The combination as claimed in claim 5 wherein the electrical drive means comprises a synchronous motor connected to the alternating current supply source, and the light source is connected to the same alternating current supply source as the motor whereby the quantity of light reaching the film from the light source during exposure of the film is independent of the time when the exposure begins and the frequency of the alternating current supply source.

9. The combination as claimed in claim 6 wherein the electrical drive means comprises a synchronous motor connected to the alternating current supply source, and the light source is connected to the same alternating current supply source as the motor whereby the quantity of light reaching the film from the light source during exposure of the film is independent of the time when the exposure begins and the frequency of the alternating current supply source.

* * * * *